United States Patent [19]

Bamji et al.

[11] Patent Number: 4,571,258

[45] Date of Patent: Feb. 18, 1986

[54] RECOVERY OF ALUMINIUM SCRAP

[75] Inventors: Pervez J. F. Bamji; Nigel P. Fitzpatrick, both of Kingston, Canada

[73] Assignee: Alcan International Limited, Montreal, Canada

[21] Appl. No.: 612,309

[22] Filed: May 21, 1984

[30] Foreign Application Priority Data

May 26, 1983 [GB] United Kingdom ............... 8314577

[51] Int. Cl.$^4$ ............................................. C22B 21/00
[52] U.S. Cl. .................................. 75/10 R; 75/65 R; 75/68 R
[58] Field of Search ..................... 75/68 R, 10 R, 65 R

[56] References Cited

U.S. PATENT DOCUMENTS

| 3,579,324 | 5/1971 | Kennedy et al. | 75/10 R |
|---|---|---|---|
| 3,790,145 | 2/1974 | Gering | 266/234 |
| 4,264,060 | 4/1981 | Twyman | 266/901 |

FOREIGN PATENT DOCUMENTS 1533420 11/1978 United Kingdom ............... 75/68 R

Primary Examiner—Melvyn J. Andrews
Attorney, Agent, or Firm—Cooper, Dunham, Clark, Griffin & Moran

[57] ABSTRACT

In a process for recovery of aluminium metal from coated light gauge aluminium scrap the scrap fragments are first decoated and then fed substantially continuously onto the surface of a body of molten metal above a channel-type induction heater. The molten metal is stirred to produce strong down flows at the molten metal surface to submerge the decoated scrap particles. The submergence may be effected by a coreless induction heater acting on the body of molten metal or other electromagnetic device such as one or more linear induction motors which are employed to set up a strong axial down flow at the center of the metal surface or to generate a vortex at that location.

10 Claims, 3 Drawing Figures

RECOVERY OF ALUMINIUM SCRAP

The present invention relates to the recovery of aluminium scrap (including aluminium alloy scrap).

Large quantities of light gauge aluminium scrap arise today in the production of beverage cans and in the recycling of recovered beverage cans, returned for recycling. Substantial quantities of scrap also arise in the form of off-cuts of extruded sections and painted siding panels. Much, if not all, of this class of scrap bears an organic paint or lacquer coating on its surface. Other quantities of aluminium scrap arise as turnings and chippings in engineering industries, but today these represent a smaller proportion of the total light gauge aluminium scrap than formerly.

In all aluminium scrap recovery, involving remelting the metal, it is important to hold down the rate of oxidation as far as possible, since the oxide represents both a loss of metal by conversion to oxide and a source of dross in which further quantities of unoxidised metal become entrapped. Oxidation problems are particularly severe in the case of light gauge metal, particularly where remelting is carried out in a reverberatory furnace. In such case it is necessary to achieve very rapid submersion of the solid scrap in the liquid metal already present in the furnace. This presents considerable difficulty where the remelting is carried out as a continuous operation, i.e. with continuous supply of scrap in finely divided form or supply of scrap in small batches at frequent intervals.

It has long been known that finely divided aluminium scrap can be remelted in a coreless induction furnace. In such furnaces there exists a pinch effect force along the horizontal axis. This force in turn produces a stirring pattern whereby molten metal in the top half of the furnace is first guided upwards centrally and then flows downwards along the walls of the furnace. A reverse stirring pattern exists in the bottom half of the furnace. The downward movement of molten metal at the walls tends to draw down finely divided scrap fed on to the surface. Since there is no overhead heating, oxidation problems are somewhat reduced. However a coreless induction furnace involves a high capital cost and is relatively inefficient in terms of its overall efficiency. Even in periods when electrical energy was much less costly than today the coreless induction furnace found relatively little favour in recovery of finely divided aluminium scrap.

Experience has already shown that it is desirable to remove any organic coating from aluminium scrap before introducing it into any form of melting furnace. The smoke and fume resulting from introduction of coated scrap lead to severe dirt problems in the furnace.

Light gauge aluminium scrap, such as beverage can scrap, has a very low bulk density, for example 15-100 kgs/m$^3$. Batch addition of such scrap to a melting furnace therefore presents problems both in the bulk of the batch and in the storage of decoated scrap prior to addition to the melting furnace charge.

Accordingly the present invention contemplates the addition of decoated scrap to a melting furnace system in a substantially continuous manner, either truly continuously or in the form of separate small batches of proportions which do not choke the charging zone and thereby impede the stirring pattern on top of the furnace. Processes for the decoating of coated aluminium scrap on a continuous scale are already known. One continuous process for decoating shredded aluminium beverage cans has already been described in copending U.S. Patent Application Ser. No. 412,273.

In continuous decoating processes the metal is heated to temperatures of the order to 500°-550° C. and substantial heat economy can be achieved by transfer of the hot decoated metal to a remelting stage without the intermediate cooling inevitably involved in collecting a substantial batch of decoated scrap.

As already indicated, the addition of light gauge aluminium scrap, particularly by reason of its low bulk density, requires mechanical assistance to ensure submersion in the molten metal in the melting furnace.

We have already found that a channel-type induction furnace is relatively efficient in terms of power consumption for melting scrap aluminium and recent developments in that type of furnace permit very high energy inputs to be achieved, and it is thus a highly suitable type of furnace for melting large quantities of scrap. One suitable form of channel-type induction furnace is described in U.S. Pat. Nos. 3,092,682 and 3,595,979. However, the channel-type induction furnace exerts very little stirring of the molten metal in the surface region and is therefore ineffective to submerge low density decoated aluminium scrap in the molten metal in the furnace at a rate comparable to the rate at which it can supply heat for melting the scrap.

According to one aspect of the present invention a process for the recovery of coated light gauge aluminium scrap comprises continuously decoating the scrap, substantially continuously supplying the decoated scrap, preferably without intermediate cooling, to a body of molten aluminium maintained above a channel-type induction furnace heating stage, stirring such body of molten aluminium to submerge the solid decoated scrap therein, supplying heat to said molten aluminium by means of said channel-type induction heating stage and withdrawing molten aluminium from said body of molten aluminium substantially continuously.

In a channel-type induction furnace heat is supplied to molten metal by means of submerged twin induction coils located in the lower part of the furnace. Metal enters the heating stage of the furnace through a throat and flows downwardly into an axial channel located between the twin coils, flows outwardly through a horizontal passage below the coils and returns upwardly through a pair of spaced channels, located outside the induction coils and arranged symmetrically in relation to the axial down flow passage. Since the heating stage of the furnace is separated from the main body of metal in the hearth of the furnace by the throat there is relatively little movement of metal in the hearth.

In the system of the present invention useful surface turbulence of metal in the main hearth of the furnace is created by magnetodynamic means so as to establish currents which will either suck down metal shreds fed onto the surface of the molten metal along the axis of the hearth or produce strong down flows at the peripheral wall of the hearth which will cause the metal shreds to flow outwards to the hearth wall and be sucked down along the hearth wall. The withdrawal of molten aluminium is preferably effected substantially continuously so as to maintain the level of such body of molten aluminium substantially constant. This level should ideally match the ability of the furnace to give optimum metal recovery. For example it has been found that the metal recovery in a coreless induction furnace is a function of the stirring patterns generated in the body of the molten metal. The stirring patterns themselves can alter according to the level of metal that is contained in the furnace above the coil. In one furnace optimum recovery of decoated beverage can shreds was obtained when the metal level in the coreless induction furnace was approximately 120-125% of the coil height.

One very effective system for carrying out the invention is a coreless induction submergence device superimposed on a channel-type induction heating stage. The coreless induction submergence device then provides the stirring action necessary for the submersion for the decoated scrap shreds at a relatively low energy input and generates sufficient heat to hold a body of molten metal at a desired temperature of the order of 720° C., from which it may be drawn off on a substantially continuous scale, matched to the rate of scrap supply. This arrangement allows metal in the coreless induction submergence stage to be held at a substantially constant level at which it is most efficient in its action as a furnace. It has been found that the efficiency, in terms of metal recovery, of coreless induction furnaces is very sensitive to metal level and that the metal level should be held substantially above the top of the furnace coils.

Although there are several possible alternatives for removal of molten metal from the body of molten metal in the coreless induction submergence stage, a linear induction motor trough conveyor is a very satisfactory device for carrying out the removal of molten metal substantially continuously. This device comprises a trough for metal flow arranged at a small angle to the horizontal and a linear induction motor arranged beneath the floor of the trough to impel the flow of a stream of molten metal upwardly in the trough, which in this instance may lead to a holding furnace.

As an alternative to employing a coreless induction submergence stage, one or more trough conveyors act on the body of molten metal to provide supplementary stirring action by impelling it either in a radial direction or in a tangential direction. One or more of the trough conveyors may be periodically reversed for drawing off the molten metal or a separate trough conveyor may be employed for removing molten metal essentially continuously.

In the operation of the channel-type induction furnace stage it is preferable that the channel velocity should be higher than 0.5 meters/sec. with 1 to 2 meters/sec. being preferable. Such high metal velocity permits the injection of gas (chlorine or inert gas) into the molten metal as it emerges from the heating channels. The high metal velocity and resultant turbulence ensures that the gas is dispersed in finely divided bubble form to perform its sparging function (removal of alkali- and alkaline earth-metals and/or removal of hydrogen). This is a definite advantage over the conventional introduction of gas at the entrance to the heating channels for cleaning purposes. The presence of large volumes of gas in the metal in the heating channels would restrict its conductivity and thus restrict the energy input. Thus the injection of gas at the outlet ends of the channels permits larger volumes of gas to be introduced effectively, while the cleanliness of the channels is maintained by the high velocity metal flow therethrough.

Referring now to the accompanying drawings.

Figure 1:
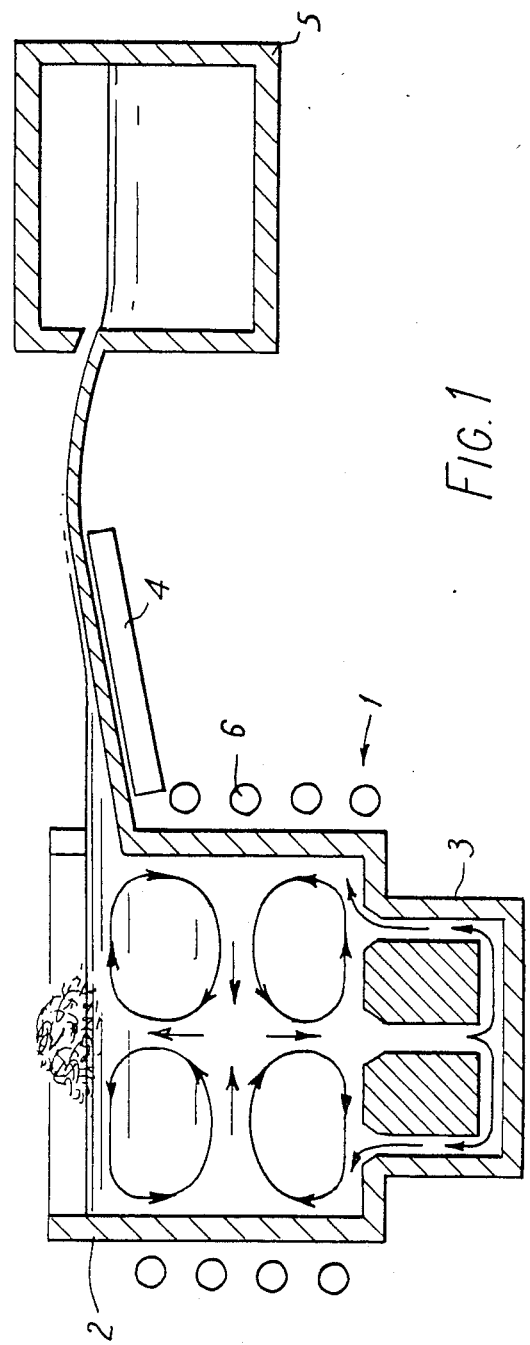
FIG. 1 illustrates diagrammatically one form of apparatus for putting the present invention into effect.

In the system of FIG. 1 a continuous stream of shredded aluminium scrap, preferably decoated, is supplied to the melting furnace 1 from a continuous decoating system, constructed and operated, for example, as described in copending U.S. Patent Application Ser. No. 412,273.

The melting furnace comprises an upper, coreless induction furnace stage 2 and a lower channeltype induction heating stage 3. The molten metal is maintained at a substantially constant level in the furnace stage 2 by means of a linear induction motorpowered trough conveyor 4, which discharges a stream of molten metal to a holding furnace 5, which may be of any suitable type, but for metal cleanliness reasons is very conveniently a low-power induction furnace.

The indicated system makes best use of the characteristics of the coreless induction furnace 2 and maintains the molten metal level substantially above the top of the coils 6 of the coreless induction furnace stage 2. The furnace 2 acts as an electromagnetic stirrer for the submergence of the shreds of solid aluminium scrap and as a means of supplying a proportion of the heat requirements of the system.

It will be seen from the indicated metal flow currents that while the molten metal flows outwardly at the upper surface in the furnace stage 2, there is a strong axial down flow in the lower portion of the coreless induction furnace stage so as to direct molten metal downwardly into the axial passage of the channel-type induction heating stage 3.

Figure 2:
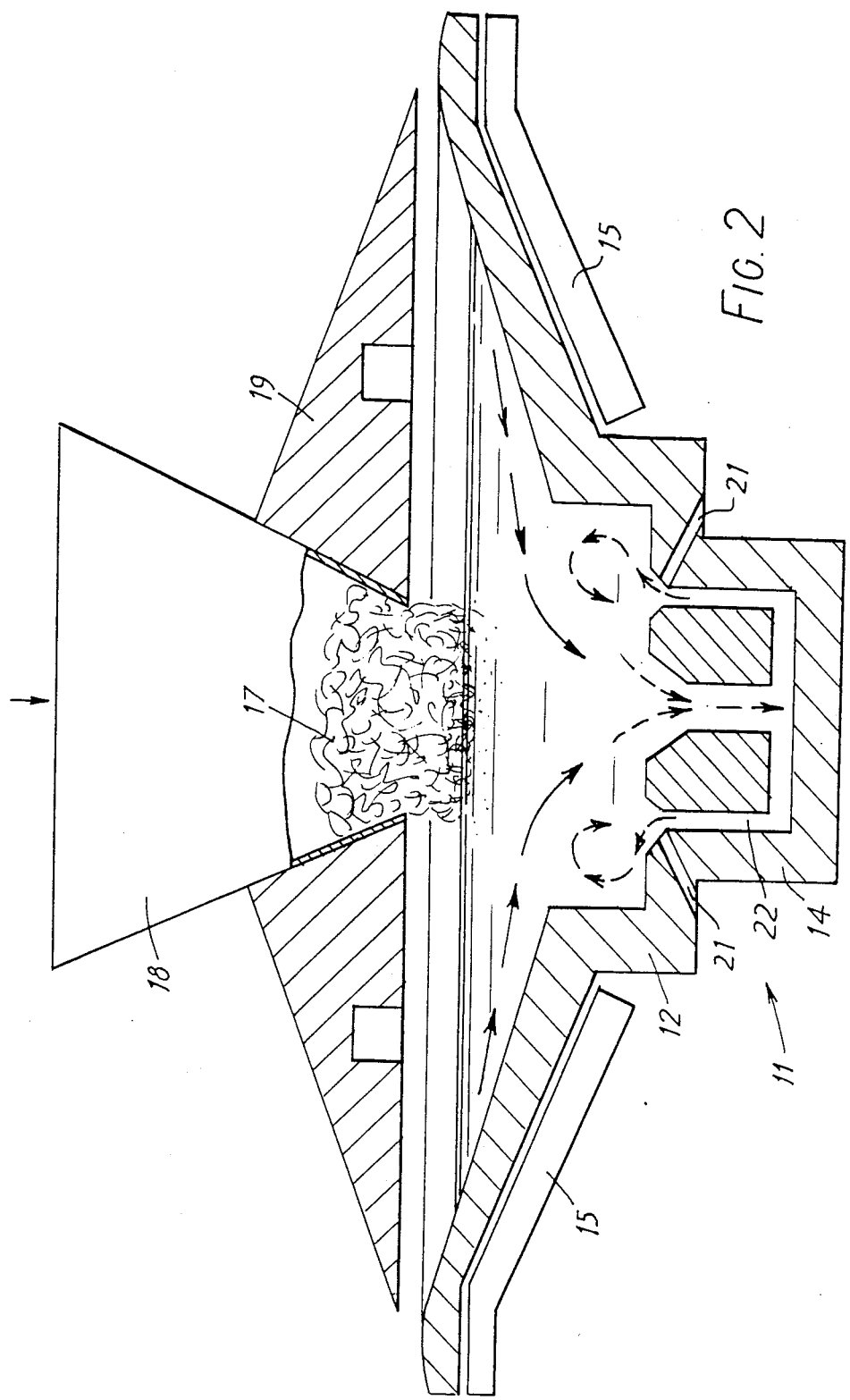
FIG. 2 illustrates an alternative form of melting furnace system.

In the alternative form of melting furnace system shown in FIG. 2 the melting furnace 11 comprises a holder 12 and channel-type induction heating stage 14. The holder is provided with a pair of diametrically opposed trough conveyors 15 which impel molten metal towards the centre of the holder thereby producing an axial suction zone into which shredded scrap fragments 17 can be charged via a hopper 18. Periodically one or more of the linear induction motors of the trough conveyors 15 can be switched on in reverse thus enabling molten metal to flow outwards into a holding furnace. The hopper 18 is surrounded by a fume extraction hood 19. In this arrangement it may be desirable to employ a central baffle plate to direct the molten metal downwardly beneath the hopper 18.

In the heating stage 14 gas injection passages 21 are arranged for injection of gas at the outlet end of each of the heating channels 22, as already described. The same arrangement may also be employed in the induction furnace stage 3 of FIG. 1.

With the arrangements of FIGS. 1 and 2 it is estimated that aluminium scrap may be melted at a rate of 5 tonnes/hr with an energy input of 300–500 Kwh/tonne of scrap depending upon whether the scrap is cold or is received at a temperature of the order of 550° C. from the decoating process.

In one example of apparatus employed in the system of FIG. 1 the coreless induction furnace could be rated at 500 kw and the channel-type induction furnace have two inductions each rated at 1000 kw.

In order to obtain satisfactory bubble sizes for gas dispersion it is necessary to inject the gas into a molten metal stream which has a Reynolds number greater that $5 \times 10^4$. If the gas is injected into metal already within a channel of the induction furnace the volume that can be introduced is limited because of an immediate reduction in apparent conductivity and metal flow rate. If the gas is injected at the channel exit amounts of gas appropriate for treatment can be added.

In one example, where the channel diameter was 6.3 cms. and the metal velocity 0.75 meters/sec., a Reynolds number of $5 \times 10^5$ was obtained.

Figure 3:
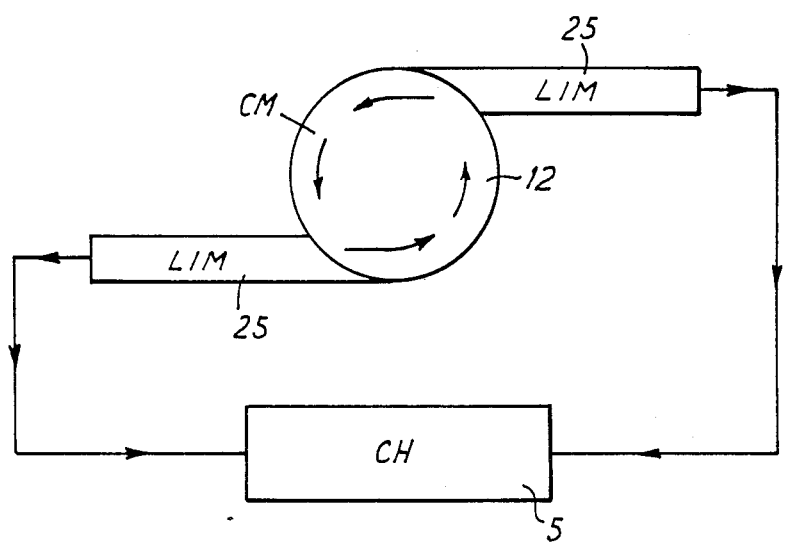
FIG. 3 shows a plan view of an alternative form of scrap metal submergence system for the melting furnace system of FIG. 2.

In the alternative construction illustrated in FIG. 3 trough conveyors 25, equipped with linear induction motors, are arranged tangentially with the melting furnace holder 12. The trough conveyors 25 are reversible, as in the construction of FIG. 2, and may be operated to draw metal off from the holder 12 to holding furnace 5 or may be operated to drive metal in the reverse direction and thus establish a vortex in the holder 12, into which the scrap metal shreds are supplied for submergence and down flow to the channel-type induction heating stage 14.

In each of the three described systems the stirring of the metal in the upper section of the furnace is achieved by magnetodynamic means without contact of the molten metal by any form of moving mechanical stirrer.

It is preferable, but not essential for the melting furnace to be constructed with a submergence stage and a channel-type induction heating stage arranged coaxially with one another. Thus, in place of the illustrated constructions, it is possible to employ two or more channel-type induction heaters arranged side-by-side beneath a single submergence stage.

We claim:

1. A process for recovery of coated light gauge aluminium scrap which comprises
   (i) continuously decoating the scrap,
   (ii) feeding the decoated scrap substantially continuously to a body of molten aluminium, having an upright axis, at least one channel-type induction heating stage being arranged beneath said body of molten aluminium for heating molten aluminium of said body,
   (iii) stirring such body of molten aluminium to submerge said scrap therein,
   (iv) continuously supplying heat to said body of molten aluminium by energizing said at least one channel-type induction heating stage, and
   (v) substantially continuously withdrawing molten aluminium from said body of molten aluminium.

2. A process according to claim 1 in which the decoated scrap is fed to the body of molten aluminium without intermediate cooling.

3. A process according to claim 1 in which the stirring of the molten aluminium is effected by electromagnetically stirring the molten aluminium free from contact with moving parts.

4. A process according to claim 1 in which a coreless induction heating stage for stirring the molten aluminium is arranged above and essentially coaxially with said at least one channel-type induction heating stage, and wherein the stirring step is performed by energizing the coreless induction heating stage.

5. A process according to claim 1 in which linear induction motors are arranged to direct streams of molten metal tangentially in relation to the axis of said body of molten metal to establish an axial vortex therein to receive solid scrap particles, and wherein the stirring step is performed by energizing the linear induction motors.

6. A process according to claim 1 in which the stirring of the molten metal is effected by linear induction motors arranged to direct streams of molten metal tangentially in relation to the axis of said body of molten metal to establish an axial vortex therein to receive solid scrap particles.

7. A process according to claim 3 in which the stirring of the body of molten aluminium establishes a strong down flow current in the metal adjacent the peripheral boundary of said body of molten aluminium and a strong upflow axially in a region adjacent the top of said body of molten aluminium.

8. A process according to claim 3 in which the stirring of the body of the molten aluminium establishes a strong down flow axially at the top of the body of molten aluminium.

9. A process according to claim 1 wherein said at least one channel-type induction heating stage defines heating channels each having an exit end, and further including injecting gas into the molten aluminium at a location adjacent the exit ends of the heating channels.

10. A process according to claim 1 wherein said at least one channel-type induction heating stage defines channels for flow of molten metal, and further including maintaining a molten metal velocity of at least 0.5 m/sec. in the channels.

* * * * *